United States Patent [19]
Sattler

[11] 3,771,122
[45] Nov. 6, 1973

[54] MOTOR VEHICLE AUTOMATIC HAZARD WARNING SYSTEM

[75] Inventor: Walter J. Sattler, Flint, Mich.

[73] Assignee: General Motors Corporation, Detroit, Mich.

[22] Filed: Aug. 11, 1972

[21] Appl. No.: 280,068

[52] U.S. Cl. .................. 340/62, 340/75, 340/81 F, 340/263
[51] Int. Cl. ............................................. B60g 1/54
[58] Field of Search ..................... 340/52 R, 62, 75, 340/81 F

[56] References Cited
UNITED STATES PATENTS

| | | | |
|---|---|---|---|
| 3,068,460 | 12/1962 | Uhrig et al. | 340/52 R UX |
| 3,611,344 | 10/1971 | Couper | 340/263 X |
| 3,728,628 | 4/1973 | Saita | 340/62 X |

Primary Examiner—Kenneth N. Leimer
Attorney—Eugene W. Christen et al.

[57] ABSTRACT

A motor vehicle automatic hazard warning system for automatically energizing the hazard warning flasher lights and horn at a predetermined speed. An operational amplifier responsive to a vehicle speed signal and a reference signal produces a control signal at the predetermined vehicle speed. The control signal triggers a switching transistor conductive to complete an energizing circuit for the operating coil of each an electrical relay which establishes an energizing circuit for the hazard warning flasher lights and the horn relay which establishes an energizing circuit for the horn.

4 Claims, 1 Drawing Figure

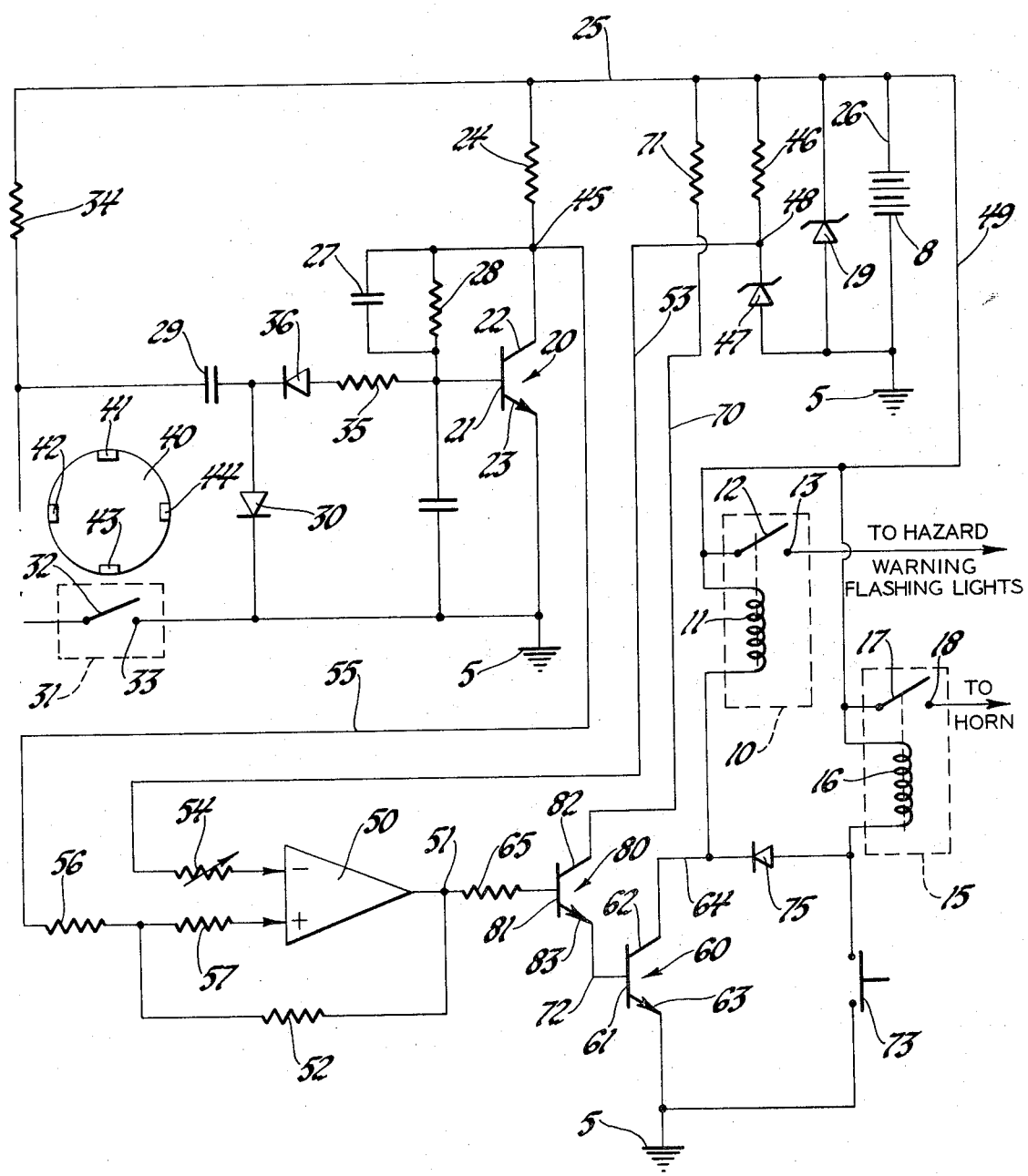

MOTOR VEHICLE AUTOMATIC HAZARD WARNING SYSTEM

This invention is directed to a motor vehicle automatic hazard warning system and, more specifically, to a motor vehicle automatic hazard warning system which automatically energizes the hazard warning flasher lights and horn when the vehicle has reached a speed of a predetermined magnitude.

A desirable feature of a modern motor vehicle is the automatic production of both audio and visual signals externally of the vehicle while traveling at a speed greater than a predetermined magnitude.

It is, therefore, an object of this invention to provide an improved motor vehicle automatic hazard warning system.

It is another object of this invention to provide an improved motor vehicle automatic hazard warning system which automatically energizes the hazard warning flasher lights and horn at speeds greater than a predetermined magnitude.

In accordance with this invention, a motor vehicle automatic hazard warning system for automatically energizing the hazard warning flasher lights and horn with vehicle speeds greater than a predetermined magnitude is provided wherein a switching transistor having the collector-emitter electrodes connected in series in the energization circuit of the operating coil of each a relay through which the hazard warning flasher lights are energized and the horn relay through which the horn is energized is triggered conductive through the collector-emitter electrodes in response to a control signal produced when a vehicle speed signal exceeds a reference signal of a substantially constant predetermined magnitude.

For a better understanding of the present invention, together with additional objects, advantages and features thereof, reference is made to the following description and accompanying single FIGURE drawing which sets forth the motor vehicle automatic hazard warning system of this invention in schematic form.

The motor vehicle automatic hazard warning system of this invention for energizing the hazard warning flasher lights and horn of the motor vehicle when the vehicle speed has reached a predetermined magnitude is set forth in schematic form in the FIGURE in combination with a source of direct current potential, which may be a battery 8, a relay 10 having an operating coil 11 and two normally open contacts 12 and 13 for establishing an energizing circuit for the hazard warning flasher lights across the source of direct current potential and a horn relay 15 having an operating coil 16 and two normally open contacts 17 and 18 for establishing an energizing circuit for the horn across the source of direct current potential.

As vehicle acceleration, deceleration and rate of speed is directly proportional to engine speed, the automatic hazard warning system of this invention will be herein described in relation to engine speed.

In the FIGURE, the output potential of battery 8 is shown to be regulated by Zener diode 19. It is to be specifically understood that this potential regulating arrangement is not absolutely necessary for the practice of this invention.

As point of reference or ground potential is the same point electrically throughout the system, it has been illustrated in the FIGURE by the accepted schematic symbol and referenced by the numeral 5.

One method, and without intention or inference of a limitation thereto, for producing a direct current speed signal of a magnitude proportional to vehicle speed may be a type NPN transistor 20 operating as a Class A amplifier having the collector electrode 22 and emitter electrode 23 thereof connected across the positive and negative polarity terminals, respectively, of battery 8 through collector resistor 24, and leads 25 and 26 and point of reference or ground potential 5, respectively; the parallel combination of capacitor 27 and resistor 28 connected across the collector electrode 22 and the base electrode 21 of transistor 20 and the parallel combination of capacitor 29 and diode 30 in series and the contacts 32 and 33 of a magnetically operated reed switch 31 connected across battery 8 through current limiting resistor 34 and leads 25 and 26 and point of reference or ground potential 5. Member 40 may be any member which may be conveniently rotated at a speed equal to or proportional to vehicle or engine speed which is arranged to carry a plurality of permanent magnets, four of which are illustrated in the FIGURE and referenced by the numerals 41, 42, 43 and 44. For example, member 40 may be a drum mounted upon the engine crankshaft, it may be a member mounted upon the engine flywheel or a member mounted upon any other vehicle part which is rotated at a speed equal to or proportional to vehicle or engine speed. It is only necessary that the permanent magnets rotated thereby are in operative relationship with the contacts 32 and 33 of reed switch 31 to operate these contacts to the electrical circuit open and closed conditions at a frequency proportional to vehicle or engine speed by passing in close proximity thereto in a manner well known in the art. While the contacts 32 and 33 of reed switch 31 are open, capacitor 29 charges through resistor 34 and diode 30 and while the contacts 32 and 33 of reed switch 31 are closed, a discharge circuit is established therethrough for capacitor 29.

Discharging capacitor 29 reduces the positive polarity potential upon the base electrode 21 of type NPN transistor 20 thereby decreasing the collector-emitter conduction therethrough as a Class A amplifier. Capacitor 27 charges through the relatively low value resistances 24 and 35 and diodes 36 and 30 and discharges through high resistance 28 or much more rapidly through the collector-emitter electrodes of type NPN transistor 20, depending upon the degree of its conductivity. Consequently, the more frequently contacts 32 and 33 of reed switch 31 are operated to the electrical circuit closed condition by the magnets carried upon rotating member 40 with increases of vehicle or engine speed, the lower the degree of conduction through type NPN transistor 20. As capacitor 27 discharges more slowly with a decrease of conduction through transistor 20, the potential appearing across junction 45 and point of reference or ground potential 5, the speed signal which is of a positive polarity upon junction 45 with respect to point of reference or ground potential 5, increases in magnitude. Consequently, this speed signal potential is of a magnitude proportional to vehicle speed.

To produce a direct current reference signal of a predetermined substantially constant magnitude, the series combination of a resistor 46 and the Zener diode 47 may be connected across battery 8 through leads 25 and 26 and point of reference or ground potential 5. Zener diode 47 is selected to have an inverse breakdown potential of a magnitude equal to the selected predetermined magnitude. Consequently, the direct current reference signal potential appearing across junction 48 and point of reference or ground potential 5 of a positive polarity upon junction 48 with respect to point of reference or ground potential 5 remains substantially constant at a magnitude equal to the inverse breakdown potential of the Zener diode selected as Zener diode 47. In one specific embodiment of the automatic hazard warning system of this invention, the selected Zener diode corresponding to Zener diode 47 had an inverse breakdown potential of seven volts.

Circuitry responsive to the speed signal appearing across junction 45 and point of reference or ground potential 5 and the reference signal appearing across junction 48 and point of reference or ground potential 5 for producing a control signal when the vehicle speed has reached a predetermined magnitude may be a conventional operational amplifier 50 having an inverting input circuit, referenced in the FIGURE as a "minus" sign, and a non-inverting input circuit, referenced in the FIGURE as a "plus" sign, and an output circuit 51, operating in the open loop mode. When operating in the open loop mode, operational amplifiers function as an extremely sensitive and rapidly operating electrical switch which produces an output signal of a positive polarity upon the output terminal 51 thereof with respect to point of reference or ground potential 5 when a positive polarity potential is applied to the inverting input circuit of a magnitude less than the positive polarity potential applied to the non-inverting input circuit and produces an output signal of substantially ground potential when a positive polarity potential is applied to the inverting input circuit of a magnitude greater than the positive polarity potential applied to the non-inverting input circuit. To provide the hysteresis required for operational amplifier 50 to produce the control signal during vehicle deceleration after the vehicle has decelerated to a speed less than the predetermined magnitude, a feedback resistor 52 is connected between output circuit 51 of operational amplifier 50 and the non-inverting input circuit thereof through resistor 57.

Circuitry responsive to the control signal produced by operational amplifier 50 for completing an energizing circuit for the operating coils 11 and 16 of relay 10 and horn relay 15, respectively, across the source of direct current potential may be any electrical switching device having normally open current carrying elements, operable to an electrical circuit closed condition in response to an electrical signal such as the control signal, connected in series with the parallel combination of operating coil 11 of relay 10 and operating coil 16 of horn relay 15 across the source of direct current potential. In the FIGURE, and without intention or inference of a limitation thereto, this electrical switching device is illustrated as a type NPN transistor 60 having the collector electrode 62 and emitter electrode 63 thereof connected in series with the parallel combination of operating coils 11 and 16 across battery 8 through a circuit which may be traced from the positive polarity terminal of battery 8 through leads 26 and 49, operating coils 11 and 16 in parallel, lead 64 and the collector-emitter electrodes of transistor 60 to a point of reference or ground potential 5. With some applications, the base electrode 61 of transistor 60 may be connected to output circuit 51 of operational amplifier 50 through current limiting resistor 65. Alternatively, a type NPN driver transistor 80 having the collector electrode 82 thereof connected to the positive polarity terminal of battery 8 through lead 70, collector resistor 71, and leads 25 and 26 and the emitter electrode 83 thereof connected to the negative polarity terminal of battery 8 through lead 72, the base-emitter electrodes of transistor 60 and point of reference or ground potential 5 may be connected between output circuit 51 of operational amplifier 50 and switching transistor 60 with the base electrode 81 thereof connected to output circuit 51 of operational amplifier 50 through current limiting resistor 65. With the first alternative, switching transistor 60 is responsive to the control signal for completing an energizing circuit for the parallel combination of operating coils 11 and 16 and with the second alternative, driver transistor 80 and switching transistor 60 are responsive to the control signal for completing an energizing circuit for the parallel combination of operating coils 11 and 16.

Assuming that the associated internal combustion engine, not shown, is operating the vehicle at idle or low engine speed, transistor 20 is operating as a Class A amplifier and the contacts 32 and 33 of reed switch 31 are being slowly operated by the magnets upon rotating member 40 and capacitor 27 is charged through resistor 24, resistor 35, diode 36 and diode 30. With these conditions, the reference potential appearing across junction 48 and point of reference or ground potential 5, applied to the inverting input circuit of operational amplifier 50 through lead 53 and resistor 54 is of a magnitude greater than the speed signal appearing across junction 45 and point of reference or ground potential 5, applied to the non-inverting input circuit of operational amplifier 50 through lead 55 and resistors 56 and 57. As the positive polarity potential present upon the inverting input circuit of operational amplifier 50 is of a magnitude greater than the positive polarity potential applied to the non-inverting input circuit thereof, output circuit 51 of operational amplifier 50 is at ground potential.

With a ground potential signal upon output circuit 51 of operational amplifier 50, neither driver transistor 80 nor switching transistor 60 is triggered conductive through the collector-emitter electrodes thereof. Consequently, operating coils 11 and 16 are not energized.

At the speed of the engine and, of course, the vehicle are increased the magnets carried by rotating member 40 operate contacts 32 and 33 of reed switch 31 more rapidly to the electrical circuit closed condition to reduce the degree of conduction through transistor 20 for the reason previously set forth. A decreased degree of conduction through transistor 20 results in the retention of a charge of increased magnitude upon capacitor 27 as it is not as rapidly discharged through conducting ransistor 20. Consequently, as the engine drives the vehicle at an increased speed, the speed signal appearing across junction 45 and point of reference or ground potential 5 continues to increase in magnitude until the vehicle has been accelerated to the speed of the predetermined magnitude, for example 60 miles per hour, at which the magnitude of the speed signal appearing across junction 45 and point of reference or ground potential 5 is of a magnitude greater than the reference potential appearing across junction 48 and point of reference or ground potential 5. With these conditions, the positive polarity speed signal potential applied to the non-inverting input circuit of operational amplifier 50 is of a magnitude greater than the reference signal potential applied to the inverting input circuit thereof. As the positive polarity speed signal potential applied to the non-inverting input circuit of operational amplifier 50 is of a magnitude greater than the positive polarity reference signal potential applied to the inverting input circuit thereof, operational amplifier 50 produces an output control signal upon output circuit 51 thereof of a positive polarity upon output circuit 51 with respect to point of reference or ground potential 5. As this control signal is applied across the base-emitter electrodes of type NPN driver transistor 80 through resistor 65 in the proper polarity relationship to produce base-emitter drive current through a type NPN transistor, driver transistor 80 is triggered conductive through the collector-emitter electrodes thereof to supply base drive current to switching transistor 60 through leads 26 and 45, collector resistor 71, lead 70, the collector-emitter electrodes of transistor 80, lead 72, the base-emitter electrodes of type NPN switching transistor 60 and point of reference or ground potential 5. This base drive current supplied to switching transistor 60 triggers this device conductive through the collector-emitter electrodes thereof to complete an energizing circuit for the parallel combination of operating coils 11 and 16 which may be traced from the positive polarity terminal of battery 8, through leads 26 and 49, operating coils 11 and 16 in parallel, lead 64, the collector-emitter electrodes of switching transistor 60 and point of reference or ground potential 5 to the negative polarity terminal of battery 8. It may be noted that with applications in which driver transistor 80 is eliminated and the base electrode 61 of type NPN switching transistor 60 is connected to output circuit 51 of operational amplifier 50 through resistor 65, the positive polarity control signal upon output circuit 51 of operational amplifier 50 is of the proper polarity relationship to produce base drive current through type NPN switching transistor 60 to trigger this device conductive through the collector-emitter electrodes to establish the same energizing circuit for the parallel combination of operating coils 11 and 16. Upon the energization of operating coils 11 and 16, the vehicle hazard warning flasher lights are energized through contacts 12 and 13 of relay 10 and the vehicle horn is energized through contacts 17 and 18 of horn relay 15.

During deceleration, the contacts 32 and 33 of reed switch 31 are operated at a proportionately lower rate, consequently, the degree of conduction through transistor 20 begins to increase proportionately, resulting in a proportionate decrease of the magnitude of the speed signal appearing across junction 45 and point of reference or ground potential 5. However, the positive polarity potential upon output circuit 51 of operational amplifier 50, applied to the non-inverting input circuit thereof through feedback resistor 52, effectively increases the magnitude of the positive polarity speed signal potential also applied to the non-inverting input circuit. Consequently, the positive polarity reference signal applied to the inverting input circuit of operational amplifier 50 is of a relatively smaller magnitude. Therefore, upon deceleration, the magnitude of the positive polarity reference signal potential applied to the inverting input circuit of operational amplifier 50 will not exceed the relative magnitude of the positive polarity speed signal potential applied to the non-inverting input circuit thereof until the speed signal potential has reduced to a value lower than that corresponding to the predetermined speed, for example 20 miles per hour. As the engine and vehicle continue to decelerate until a speed is reached at which the reference signal potential is of a magnitude greater than the relative speed signal potential, operational amplifier 50 again produces a ground signal upon the output circuit 51 thereof. Upon the appearance of this ground signal, drive transistor 80 and switching transistor 60 or, alternatively, only switching transistor 60 in the event driver transistor 80 is not employed, are extinguished thereby to interrupt the energizing circuit for operating coils 11 and 16. Upon the interruption of the energizing circuit for operating coils 11 and 16, the associated respective normally open contacts 12 and 13 of relay 10, 17 and 18 of horn relay 15 open to interrupt the energizing circuit for the hazard warning flasher lights and the horn, respectively. Momentary contact push button 73 is the horn button which, when depressed, completes an energizing circuit to ground 5 for operating coil 16 of horn relay 15 and diode 75 prevents the energization to ground 5 of operating coil 11 of relay 10 when the horn button is depressed to manually sound the horn.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A motor vehicle automatic hazard warning system for energizing the hazard warning flasher lights and horn of the motor vehicle when the vehicle speed has reached a predetermined magnitude comprising in combination with a source of direct current potential, a relay having an operating coil and two normally open contacts for establishing an energizing circuit for the hazard warning flasher lights across the source of direct current potential and a horn relay having an operating coil and two normally open contacts for establishing an energizing circuit for the horn across the source of direct current potential, means for producing a direct current speed signal of a magnitude proportional to vehicle speed, means for producing a direct current reference signal of a predetermined substantially constant magnitude, an operational amplifier having an inverting input circuit, a non-inverting input circuit and an output circuit for producing a control signal upon said output circuit thereof, means for applying said direct current speed signal to said non-inverting input circuit of said operational amplifier, means for applying said direct current reference signal to said inverting input circuit of said operational amplifier, and means responsive to said control signal for completing an energizing circuit for each said relay operating coil and said horn relay operating coil in parallel across said source of direct current potential.

2. A motor vehicle automatic hazard warning system for energizing the hazard warning flasher lights and horn of the motor vehicle when the vehicle speed has reached a predetermined magnitude comprising in combination with a source of direct current potential, a relay having an operating coil and two normally open contacts for establishing an energizing circuit for the hazard warning flasher lights across the source of direct current potential and a horn relay having an operating coil and two normally open contacts for establishing an energizing circuit for the horn across the source of direct current potential, means for producing a direct current speed signal which is of a magnitude proportional to vehicle speed, means for producing a direct current reference signal of a predetermined substantially constant magnitude, an operational amplifier having an inverting input circuit, a non-inverting input circuit and an output circuit for producing a control signal upon said output circuit thereof, means for applying said direct current speed signal to said non-inverting input circuit of said operational amplifier, means for applying said direct current reference signal to said inverting input circuit of said operational amplifier, an electrical switching device having normally open current carrying elements operable to an electrical circuit closed condition in response to said control signal, and means for connecting said current carrying elements of said electrical switching device in series with the parallel combination of said relay operating coil and said horn relay operating coil across said source of direct current potential.

3. A motor vehicle automatic hazard warning system for energizing the hazard warning flasher lights and horn of the motor vehicle when the vehicle speed has reached a predetermined magnitude comprising in combination with a source of direct current potential, a relay having an operating coil and two normally open contacts for establishing an energizing circuit for the hazard warning flasher lights across the source of direct current potential and a horn relay having an operating coil and two normally open contacts for establishing an energizing circuit for the horn across the source of direct current potential, means for producing a direct current speed signal which is of a magnitude proportional to vehicle speed, means for producing a direct current reference signal of a predetermined substantially constant magnitude, an operational amplifier having an inverting input circuit, a non-inverting input circuit and an output circuit for producing a control signal upon said output circuit thereof, means for applying said direct current speed signal to said non-inverting input circuit of said operational amplifier, means for applying said direct current reference signal to said inverting input circuit of said operational amplifier, a transistor having collector, emitter and base electrodes, means for applying said control signal upon said output circuit of said operational amplifier to said base electrode of said transistor, and means for connecting said collector-emitter electrodes of said transistor in series with the parallel combination of said relay operating coil and said horn relay operating coil across said source of direct current potential.

4. A motor vehicle automatic hazard warning system for energizing the hazard warning flasher lights and horn of the motor vehicle when the vehicle speed has reached a predetermined magnitude comprising in combination with a source of direct current potential, a relay having an operating coil and two normally open contacts for establishing an energizing circuit for the hazard warning flasher lights across the source of direct current potential and a horn relay having an operating coil and two normally open contacts for establishing an energizing circuit for the horn across the source of direct current potential, means for producing a direct current speed signal which is of a magnitude proportional to vehicle speed, means for producing a direct current reference signal of a predetermined substantially constant magnitude, an operational amplifier having an inverting input circuit, a non-inverting input circuit and an output circuit for producing a control signal upon said output circuit thereof, means for applying said direct current speed signal to said non-inverting input circuit of said operational amplifier, means for applying said direct current reference signal to said inverting input circuit of said operational amplifier, first and second transistors each having collector, emitter and base electrodes, means for connecting said output circuit of said operational amplifier to said base electrode of said first transistor, means for connecting said collector-emitter electrodes of said first transistor and said base-emitter electrodes of said second transistor in series across said source of direct current potential, and means for connecting said collector-emitter electrodes of said second transistor in series with the parallel combination of said relay operating coil and said horn relay operating coil across said source of direct current potential.

* * * * *